United States Patent
Hsu et al.

(10) Patent No.: US 11,320,328 B2
(45) Date of Patent: May 3, 2022

(54) OPERATION PARAMETER DETECTING APPARATUS FOR VEHICLE

(71) Applicant: GIANT ELECTRIC VEHICLE KUNSHAN CO., LTD, Jiangsu (CN)

(72) Inventors: Shih Wei Hsu, Kaohsiung (TW); Chun-Tien Lu, Kaohsiung (TW); Shou-Xin Huang, Jiangsu (CN)

(73) Assignee: GIANT ELECTRIC VEHICLE KUNSHAN CO., LTD, Jiangsu (CN)

( * ) Notice: Subject to any disclaimer, the term of this patent is extended or adjusted under 35 U.S.C. 154(b) by 402 days.

(21) Appl. No.: 16/610,920

(22) PCT Filed: May 4, 2018

(86) PCT No.: PCT/CN2018/085594
§ 371 (c)(1),
(2) Date: Nov. 5, 2019

(87) PCT Pub. No.: WO2018/202124
PCT Pub. Date: Nov. 8, 2018

(65) Prior Publication Data
US 2020/0056951 A1    Feb. 20, 2020

(30) Foreign Application Priority Data

May 5, 2017  (CN) .......................... 201710312424.5
May 5, 2017  (CN) .......................... 201710312886.7
(Continued)

(51) Int. Cl.
*G01L 3/10*    (2006.01)
*G01B 7/30*    (2006.01)
(Continued)

(52) U.S. Cl.
CPC ................ *G01L 3/101* (2013.01); *G01B 7/30* (2013.01); *G01D 5/145* (2013.01); *G01P 3/44* (2013.01);
(Continued)

(58) Field of Classification Search
CPC .......... G01L 3/101; G01B 7/30; G01D 5/145; G01D 5/14; G01P 3/44; B62J 45/40;
(Continued)

(56) References Cited

U.S. PATENT DOCUMENTS 4,933,580 A * 6/1990 Ishino ..................... G01L 3/102
                                                             73/DIG. 2
5,585,574 A * 12/1996 Sugihara ............... H01L 41/125
                                                             73/862.333
(Continued)

FOREIGN PATENT DOCUMENTS

CN        1399121 A       2/2003
CN        201177539 Y     1/2009
(Continued)

*Primary Examiner* — Freddie Kirkland, III
(74) *Attorney, Agent, or Firm* — CKC & Partners Co., LLC

(57) ABSTRACT

An operation parameter detecting apparatus for a vehicle is provided to obtain a pedaling torque value, an angle of a central shaft with a magnetic ring, a corresponded rotating speed and a corresponded pedaling power, respectively by measuring an electromagnetic force of a coil induced by a magnetic variation due to a deformation of a covered magnetic sleeve linked to a central shaft, a voltage output from at least a Hall corresponded to a magnetic flux density of which the distribution in a 1, 2 or 3 dimensional space is partly a monotonic increasing or decreasing function in an area with the same polarity, and at calculation relative to the time.

32 Claims, 20 Drawing Sheets

(30) Foreign Application Priority Data

May 5, 2017 (CN) .......................... 201720493344.X
May 5, 2017 (CN) .......................... 201720493909.4

(51) Int. Cl.
| | | |
|---|---|---|
| G01D 5/14 | (2006.01) | |
| G01P 3/44 | (2006.01) | |
| B62J 45/40 | (2020.01) | |
| B62J 99/00 | (2020.01) | |
| B62M 6/50 | (2010.01) | |

(52) U.S. Cl.
CPC ............... *B62J 45/40* (2020.02); *B62J 99/00* (2013.01); *B62M 6/50* (2013.01)

(58) Field of Classification Search
CPC .......... B62J 99/00; B62M 6/50; B62M 3/003; B62K 19/34
See application file for complete search history.

(56) References Cited

U.S. PATENT DOCUMENTS

| | | | | |
|---|---|---|---|---|
| 5,816,599 | A * | 10/1998 | Soejima | ............... B62M 3/003 74/594.2 |
| 6,865,959 | B2 * | 3/2005 | Kilmartin | ............... G01L 3/102 73/862.333 |
| 7,677,115 | B2 * | 3/2010 | Fukuda | ................... G01L 3/105 73/862.335 |
| 8,316,709 | B2 * | 11/2012 | Grab | ................... A63B 22/0605 73/379.01 |
| 8,807,260 | B2 * | 8/2014 | Shimizu | ................... B62M 3/003 180/220 |
| 8,925,395 | B2 * | 1/2015 | Hsu | ........................ G01L 3/1435 73/862.635 |
| 9,506,824 | B2 * | 11/2016 | Motoe | ..................... H01L 41/20 |
| 10,184,847 | B2 * | 1/2019 | Ishikawa | ................. G01L 3/105 |
| 10,502,646 | B2 * | 12/2019 | Ishikawa | ................. G01L 3/102 |
| 2008/0245160 | A1 * | 10/2008 | Watarai | ................. G01L 3/102 73/862.321 |
| 2010/0093494 | A1 * | 4/2010 | Smith | ..................... G01L 3/104 482/8 |
| 2013/0014596 | A1 | 1/2013 | Hsu | |
| 2017/0003182 | A1 * | 1/2017 | Schweizer | ............. G01L 3/109 |
| 2017/0113756 | A1 | 4/2017 | Yoshiie et al. | |

FOREIGN PATENT DOCUMENTS

| | | |
|---|---|---|
| CN | 103171733 A | 6/2013 |
| CN | 203806093 U | 9/2014 |
| CN | 105015692 A | 11/2015 |
| CN | 206919905 U | 1/2018 |
| CN | 207141295 U | 3/2018 |
| JP | 2003106807 A | 4/2003 |
| TW | 467091 U | 12/2001 |
| TW | I427918 B | 2/2014 |

* cited by examiner

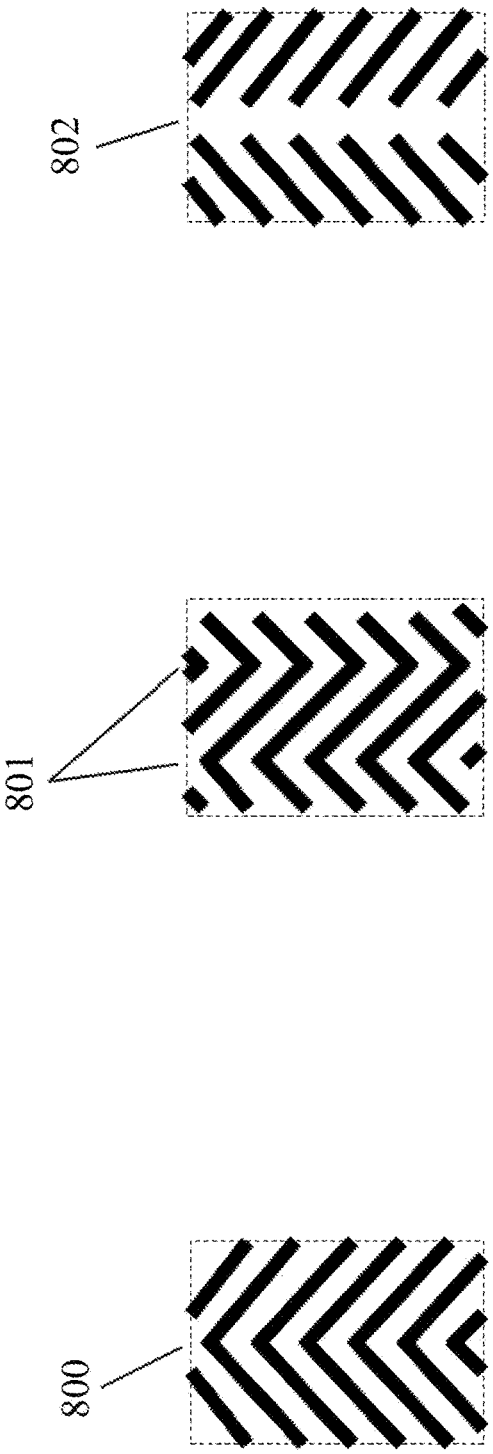
Fig. 8
Fig. 9
Fig. 10
Fig. 11
Fig. 12

OPERATION PARAMETER DETECTING APPARATUS FOR VEHICLE

RELATED APPLICATIONS

This application is a continuation of International application No. PCT/CN2018/085594, filed May 4, 2018, which claims the benefits of priorities of CN application No. 201710312424.5, filed on May 5, 2017, CN application No. 201720493909.4, filed on May 5, 2017, CN application No. 201710312886.7, filed on May 5, 2017 and CN application No. 201720493344.X, filed on May 5, 2017, the content of which are incorporated herein by reference.

BACKGROUND

Technical Field

This disclosure relates to a vehicle apparatus for detecting operation parameters and, more particularly, for detecting a torque, a position angle, a rotating angle, a rotating speed and a power of a central shaft located in a bicycle, a tricycle or an electric one.

Description of Related Art

Riding a bicycle, a tricycle or an electric one has become an important activity of modern people while in transportation, commute, leisure or athletic sport because it is environmental protective, low energy consumption, low cost and easily implemented. There are various kinds of e-bikes, bicycles or tricycles. Among these products, one with motorization assistance or an intelligent assistance is popular since it is free from contamination and can increase pedaling efficiency by the motorization assistance or the intelligent assistance. The vehicle with motorization assistance or a power meter has a capability of detecting pedaling torque or crank rotating speed to increase the riding efficiency and the riding comfortableness.

In one example, in an electric bicycle with the capability of detecting torque, a Hall sensor is used to detect the rotating speed of the central shaft or the torque of pedaling. This kind of sensor is commonly disposed on the surface of the central shaft or the chain ring which rotates during riding. When the electric bicycle is pedaling, the central shaft or the chain ring receives the torque and forms a deformation, the Hall sensor outputs an electronic signal corresponded to the deformation, and then the electronic signal is analyzed to control the output power of the motor. However, this kind of sensor has low accuracy owing to its different location and analyzing methods it used.

Therefore, there is a need to develop a detecting apparatus for accurately detecting important operation parameters of a bicycle with motorization, a bicycle without motorization, a motorcycle with motorization, a motorcycle without motorization, a tricycle with motorization or a tricycle without motorization.

SUMMARY

It is an aspect of the present disclosure to provide an operation parameter detecting that is capable of detecting a torque at two sides of the central shaft, a position angle, a rotating speed and a power. The measurement data has high reliability, high consistency, high precision and high resolution.

It is another aspect of the present disclosure to provide an operation parameter detecting apparatus for a vehicle. A pattern of a magnetic material on a surface of a sleeve is changed while an external force is exerted to the sleeve. The magnetic permeability of the magnetic material is varied by a deformation of the sleeve, thus a coil can generate a corresponding induced electromotive force. A torque value of a central shaft can be obtained by measuring a voltage value of the coil. A magnetic ring is fixed on the central shaft. A distribution of a magnetic flux density on the surface of the magnetic ring is partly a monotonic increasing function or a monotonic decreasing function, thus a first or a second Hall sensor correspondingly outputs a voltage (e.g. an analog voltage), which is corresponded to a position angle value of the central shaft. Furthermore, the magnetic ring is rotated by the central shaft to change the distribution of the magnetic flux density in the space, thereby inducing a variation of the output voltage from the first Hall sensor or the second Hall sensor. A rotating angle value of the central shaft can be obtained by analyzing the variation of the voltage, and a rotating speed value of the central shaft can be obtained from a variation of the rotating angle value per unit time.

According to one embodiment of the present disclosure, an operation parameter detecting apparatus includes a central shaft, a left crank, a right crank, a sleeve, a magnetic material, a coil, a magnetic ring, a first Hall sensor and an electronic signal processing unit. The central shaft is disposed in a bottom bracket of the vehicle. The left crank and the right crank are oppositely disposed at two ends of the central shaft. The sleeve is disposed on the central shaft. The magnetic material surrounds a surface of the sleeve without being glued and with a pattern. The coil surrounds the magnetic material to detect magnetic variations of the magnetic material. The magnetic ring is fixed on the central shaft. The first Hall sensor is corresponded to the magnetic coil and for detecting a magnetic flux density on a surface of the magnetic ring. The electronic signal processing unit is electrically connected to the coil and the first Hall sensor. Each of the left crank and the right crank generates a torque relative to the central shaft to form a deformation of the sleeve, so that the coil generates an induced electromotive force for producing a voltage value by changing a magnetic permeability of the magnetic material, and the electronic signal processing unit analyzes the voltage value so as to obtain a torque value. The magnetic ring is rotated with the central shaft, so to change a corresponding distribution of the magnetic flux density and a voltage output from the first Hall sensor so that the electronic signal processing unit analyzes thereby a variation of the voltage to obtain a rotating angle value of the central shaft. The electronic signal processing unit calculates a variation of the rotating angle per unit time for obtaining a rotating speed value of the central shaft.

According to another embodiment of the present disclosure, an operation parameter detecting apparatus for a vehicle is provided. The detecting apparatus includes a central shaft, a left crank, a right crank, a sleeve, a magnetic material, at least one coil, a magnetic ring, at least two Hall sensors and an electronic signal processing unit. The central shaft is disposed in a bottom bracket of the vehicle. The left crank and the right crank are oppositely disposed at two ends of the central shaft. The sleeve is disposed on the central shaft. The magnetic material surrounds a surface of the sleeve without being glued and with a pattern. The coil surrounds the magnetic material to detect magnetic variations of the magnetic material. The magnetic ring is rotated with the central shaft, wherein a distribution of a magnetic flux density in a two dimensional space or a three dimensional space on a surface of the magnetic ring is represented as at least one curve trace, and a variation of the magnetic flux density corresponding to the curve trace is partly a monotonic increasing function or a monotonic decreasing function. The two Hall sensors are corresponded to the magnetic ring to detect the magnetic flux density on the surface of the magnetic ring in the two dimensional space or the three dimensional space, wherein the position or the orientation of the Hall sensors are different. The electronic signal processing unit is electrically connected to the coil and the Hall sensors. Each of the left crank and the right crank generates a torque relative to the central shaft to form a deformation of the sleeve, so that the coil generates an induced electromotive force for producing a voltage value by changing a magnetic permeability of the magnetic material, and the electronic signal processing unit analyzes the voltage value so as to obtain a torque value. A distribution of a one, two or three dimensional magnetic flux density changes as the magnetic ring rotated with the central shaft, so Hall sensors outputted plural voltage values, of which the combination presents partly a monotonic increasing function or a monotonic decreasing function, and the electronic signal processing unit analyzes the values of the voltages and variations of the values to obtain a position angle value or a rotating angle value of the central shaft. The electronic signal processing unit calculates a variation of the rotating angle value per unit time for obtaining a rotating speed value of the central shaft.

BRIEF DESCRIPTION OF THE DRAWINGS

FIG. 8 illustrates an arrangement of a V-shaped pattern according to the present disclosure;

FIG. 9 illustrates an arrangement of a Z-shaped pattern according to the present disclosure;

FIG. 10 illustrates another arrangement of the V-shaped pattern according to the present disclosure;

FIG. 11 illustrates another arrangement of the Z-shaped pattern according to the present disclosure;

FIG. 12 illustrates still another arrangement of the Z-shaped pattern according to the present disclosure;

DETAILED DESCRIPTION

Figure 1:
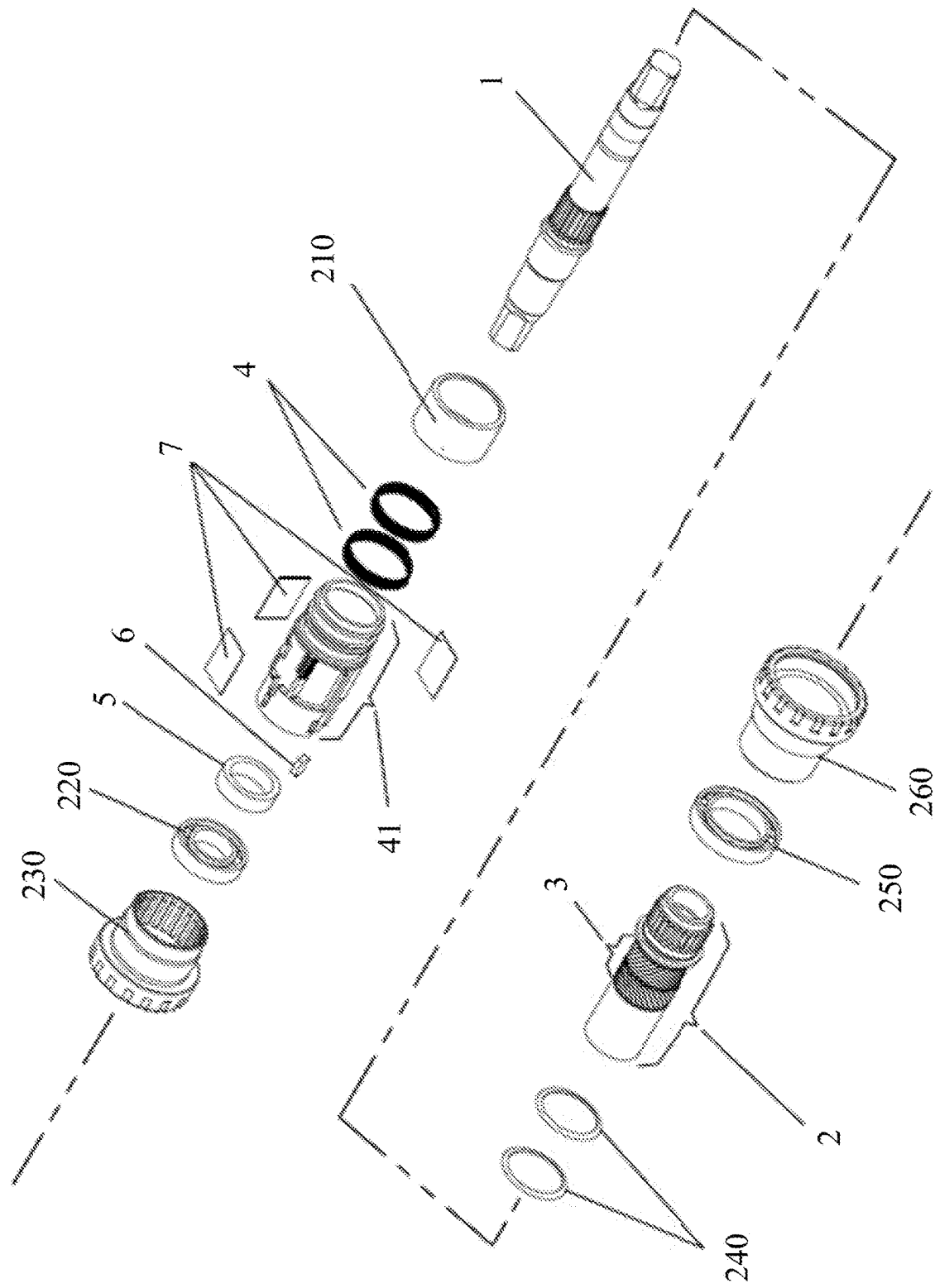
FIG. 1 illustrates an exploded view of an operation parameter detecting apparatus for a vehicle according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. It should be understood that some details of the embodiments can be omitted and will not limit the present disclosure.

Figure 2:
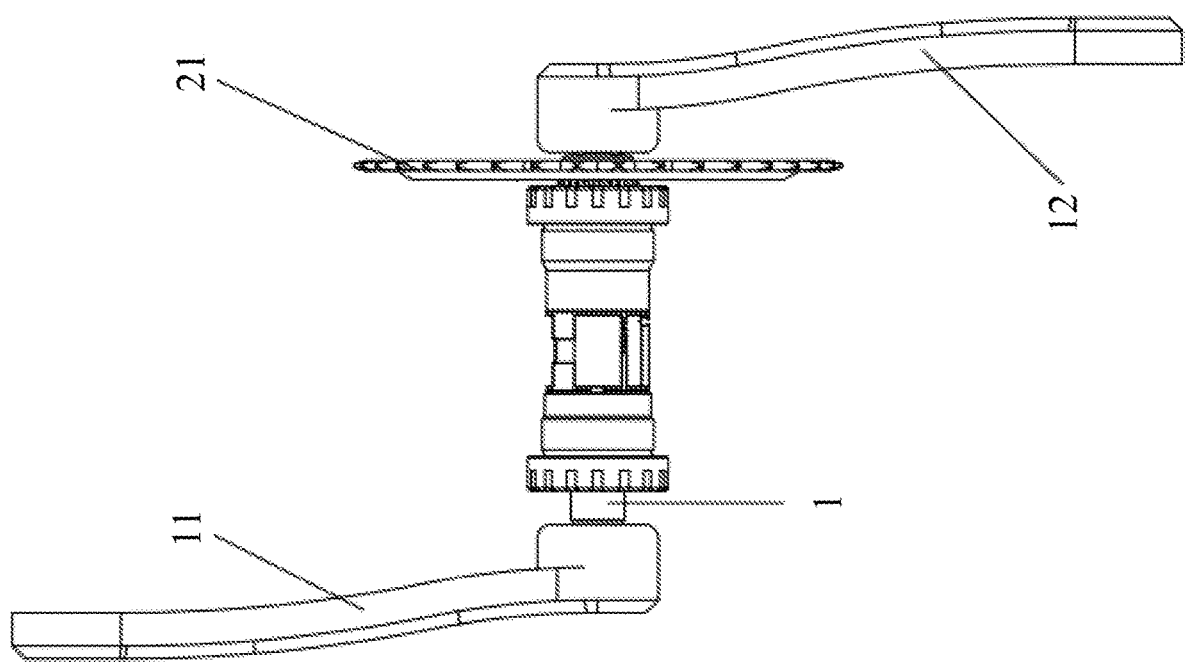
FIG. 2 illustrates an assembly of the operation parameter detecting apparatus of FIG. 1.
Figure 3:
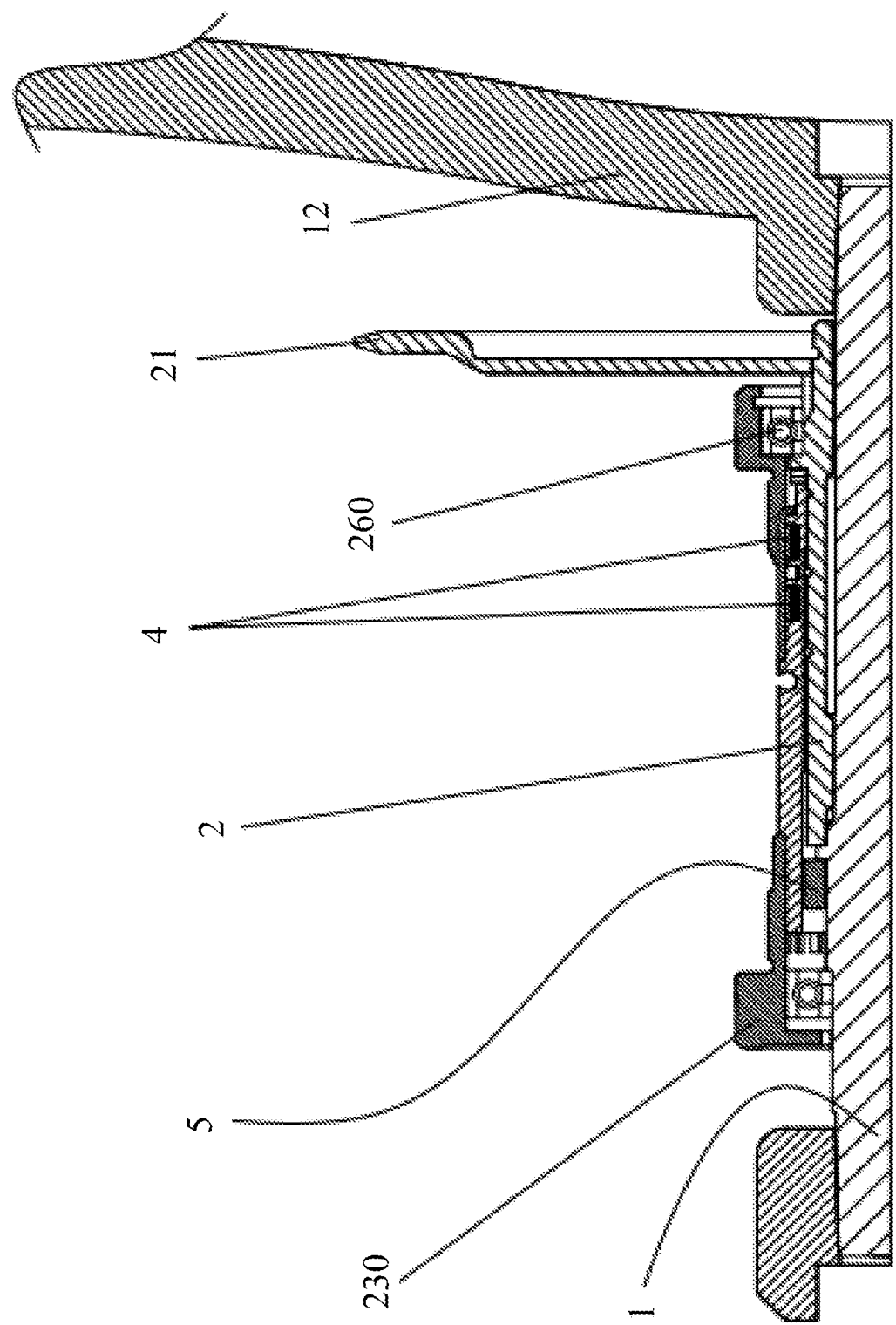
FIG. 3 illustrates a partially sectional view of the operation parameter detecting apparatus of FIG. 2.
Figure 4:
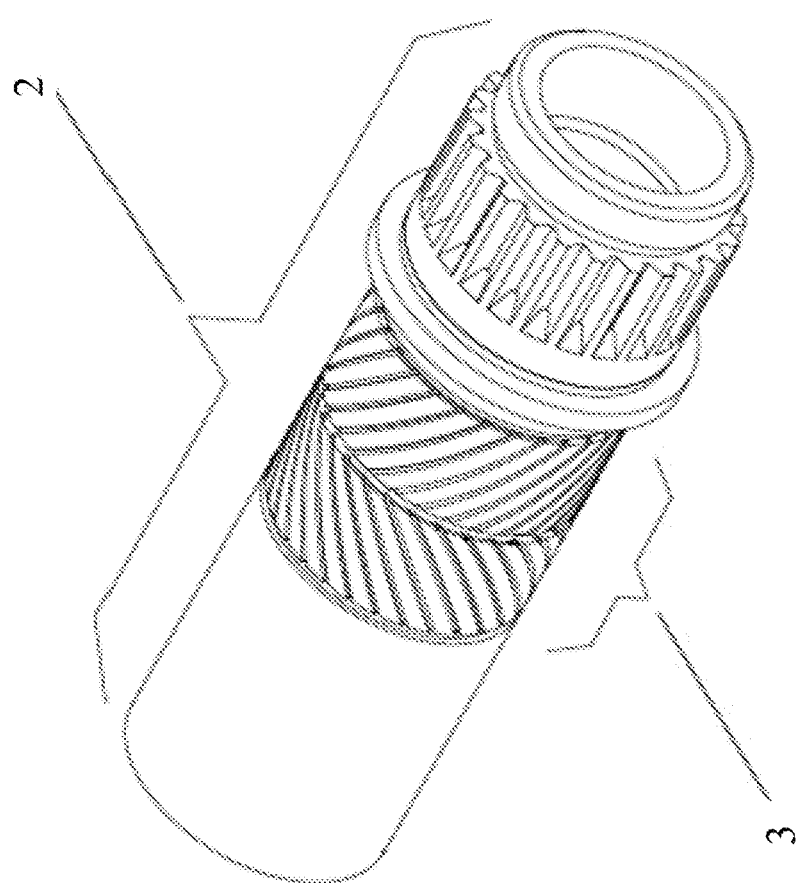
FIG. 4 illustrates an oblique view of a pattern of a magnetic material on a sleeve of the operation parameter detecting apparatus according to the present disclosure.
Figure 5:
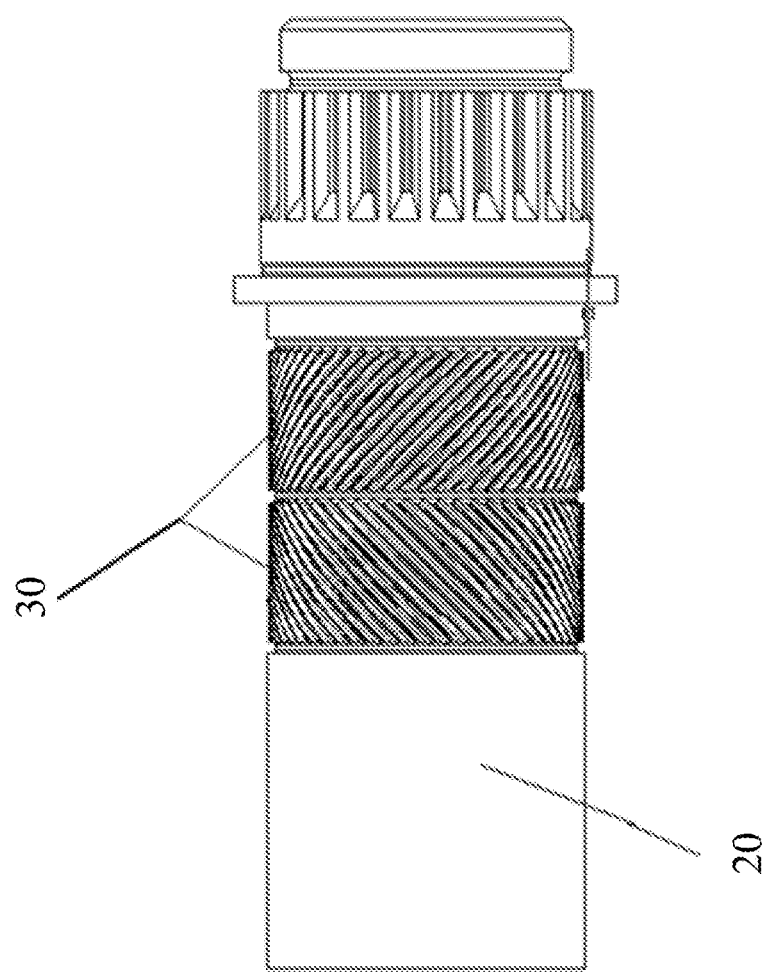
FIG. 5 illustrates a front view of the pattern of the magnetic material on the sleeve of the operation parameter detecting apparatus according to the present disclosure.

Please refer to FIG. 1 to FIG. 5. FIG. 1 illustrates an exploded view of an operation parameter detecting apparatus for a vehicle according to one embodiment of the present disclosure; FIG. 2 illustrates an assembly of the operation parameter detecting apparatus of FIG. 1; FIG. 3 illustrates a partially sectional view of the operation parameter detecting apparatus of FIG. 2, wherein a sleeve 2 is directly connected to the chain ring 21; FIG. 4 illustrates an oblique view of a pattern of a magnetic material 3 on a sleeve 2 of the operation parameter detecting apparatus according to the present disclosure; FIG. 5 illustrates a front view of the pattern of the magnetic material 3 on the sleeve 2 of the operation parameter detecting apparatus according to the present disclosure. The operation parameter detecting apparatus for a vehicle can be applied to an electrical vehicle or a non-electrical vehicle, such as bike, motorcycle, tricycle, etc., and which is not limited thereto.

In one embodiment, the operation parameter detecting apparatus for a vehicle (e.g. a bicycle) of the present disclosure at least includes a central shaft 1, a left crank 11, a right crank 12, a sleeve 2, a magnetic material 3, a coil 4, an electronic signal processing unit 7, a magnetic ring 5 and a first Hall sensor 6.

The assembling relationships of the aforementioned elements are described as follows. The central shaft 1 is disposed in a bottom bracket of the bicycle. The left crank 11 and the right crank 12 are oppositely disposed in two ends of the central shaft 1. The left crank 11 and the right crank 12 are extended outward relative the central shaft 1 to generate a torque. Different positions of the left crank 11 and the right crank 12 can be used to recognize different measurement data from the left crank 11 and the right crank 12. The sleeve 2 is disposed on the central shaft 1. The magnetic material 3 surrounds a surface of the sleeve 2, and the magnetic material 3 forms a pattern. The coil 4 surrounds the magnetic material 3 to detect magnetic variations of the magnetic material 3. The electronic signal processing unit 7 is electrically connected to the coil 4 and the first Hall sensor 6. The magnetic ring 5 is corresponded to the first Hall sensor 6. The magnetic ring 5 is glue-attached or injecting-molded on a surface of the central shaft 1; therefore the magnetic ring 5 is fixed on the central shaft 1 and is linked with the central shaft 1. A chain ring 21 is disposed on the central shaft 1, one end of the sleeve 2 is connected to the central shaft 1, and the other end of the sleeve 2 is directly connected to the chain ring 21 or connected to the chain ring 21 through an adaptor (not shown). When a rider of the bicycle depresses a pedal to rotate the left crank 11 and the right crank 12, the chain ring 21 is rotated, and a rear wheel of the bicycle is rotated to drive the bicycle.

In the aforementioned structure, the sleeve 2 receives and transfers a torque generated from the left crank 11 relative to the central shaft 1, and a torque generated from the right crank 12 relative to the central shaft 1, thereby deforming the sleeve 2 (shear deformation). Magnetoelastic effect occurs due to the influence of the torque, and therefore the magnetic permeability at the pattern area of the magnetic material 3 is increased or decreased, so as to get the corresponded variation of the coil 4 surrounding the pattern area of the magnetic material 3. Furthermore, when the bicycle is pedaled by the cyclist, the left crank 11 and the right crank 12 are rotated thereby rotating the central shaft 1. At the time, the magnetic ring 5 is rotated with the central shaft 1, and a distribution of a magnetic flux density on a surface of the magnetic ring 5 is partly a monotonic increasing function or a monotonic decreasing function; preferably, the distribution of the magnetic flux density in an area with the same polarity is partly a strictly increasing function or a strictly decreasing function. The magnetic ring 5 is varied with a rotating angle of the central shaft 1, thereby a distribution of a magnetic flux density around the first Hall sensor 6 is also changed to be represented partly as a monotonic increasing function or a monotonic decreasing function; preferably be represented partly as a strictly increasing function or a strictly decreasing function. Thereby, an output voltage from the first Hall sensor 6 is an analog voltage and is partly a monotonic increasing function or a monotonic decreasing function; preferably a strictly increasing function or a strictly decreasing function (e.g. a sine waveform, a triangle waveform or other possible waveforms). The coil 4 and the first Hall sensor 6 are both electrically connected to the electronic signal processing unit 7. Therefore, by analyzing a value and a variation of the voltage with the sine waveform outputted from the first Hall sensor 6 and a value and a variation of a voltage with the sine waveform of the coil 4 through the electronic signal processing unit 7, a torque value, a position angle value and a rotating angle value of the central shaft 1 can be precisely obtained. Furthermore, a rotating speed value of the central shaft 1 can be obtained by analyzing the value of the voltage with the sine waveform per unit time. Therefore, the operation parameter detecting apparatus of the present disclosure can instantly, safely and reliably measure the operation parameters (the torque value, the position angle value, the rotating angle value and the rotating speed value) of the central shaft 1 of the bicycle, thus a feedback can be obtained instantly to increase the pedaling efficiency and the efficiency of magneto booster.

The number of the coil 4 can be one set, two sets, three sets or more, and the winding directions thereof can be the same or different, so as to eliminate the common mode noise.

In one embodiment, a plastic base 41 is disposed between the central shaft 1 and the sleeve 2. An electromagnetic shielding cover 210 is disposed around the coil 4. A left bearing 220 is disposed in one end of the central shaft 1, and a right bearing 250 is disposed in the other end of the central shaft 1. A left bottom bracket cup 230 is set with the left bearing 220, and a right bottom bracket cup 260 is set with the right bearing 250. The central shaft 1 is located in the bottom bracket of the bicycle by the left bearing 220, the left bottom bracket cup 230, the right bearing 250 and the right bottom bracket cup 260. Furthermore, a gasket 240 can be disposed between a right side or a left side of the sleeve 2 and the central shaft 1 to ensure smooth rotation between the sleeve 2 and the central shaft 1.

Figure 6:
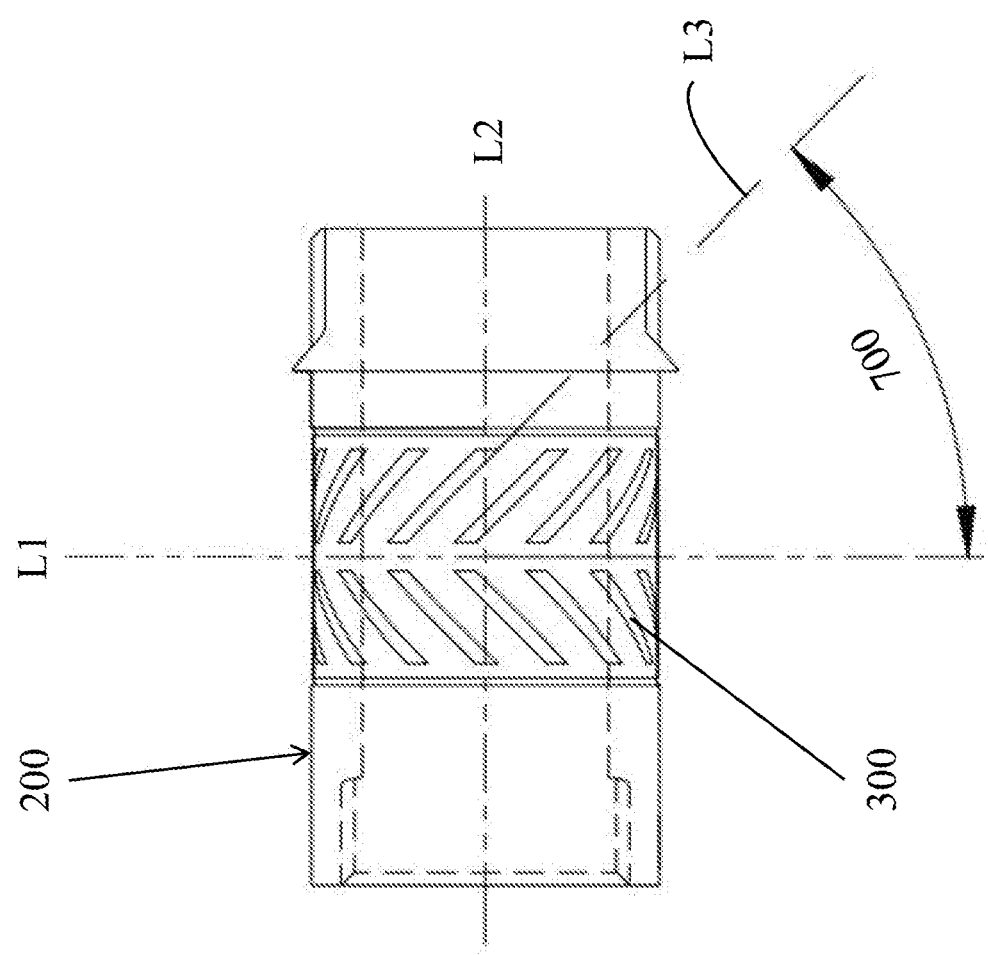
FIG. 6 illustrates an angle formed between a vertical line and strips of the pattern of FIG. 5 according to the present disclosure.
Figure 7:
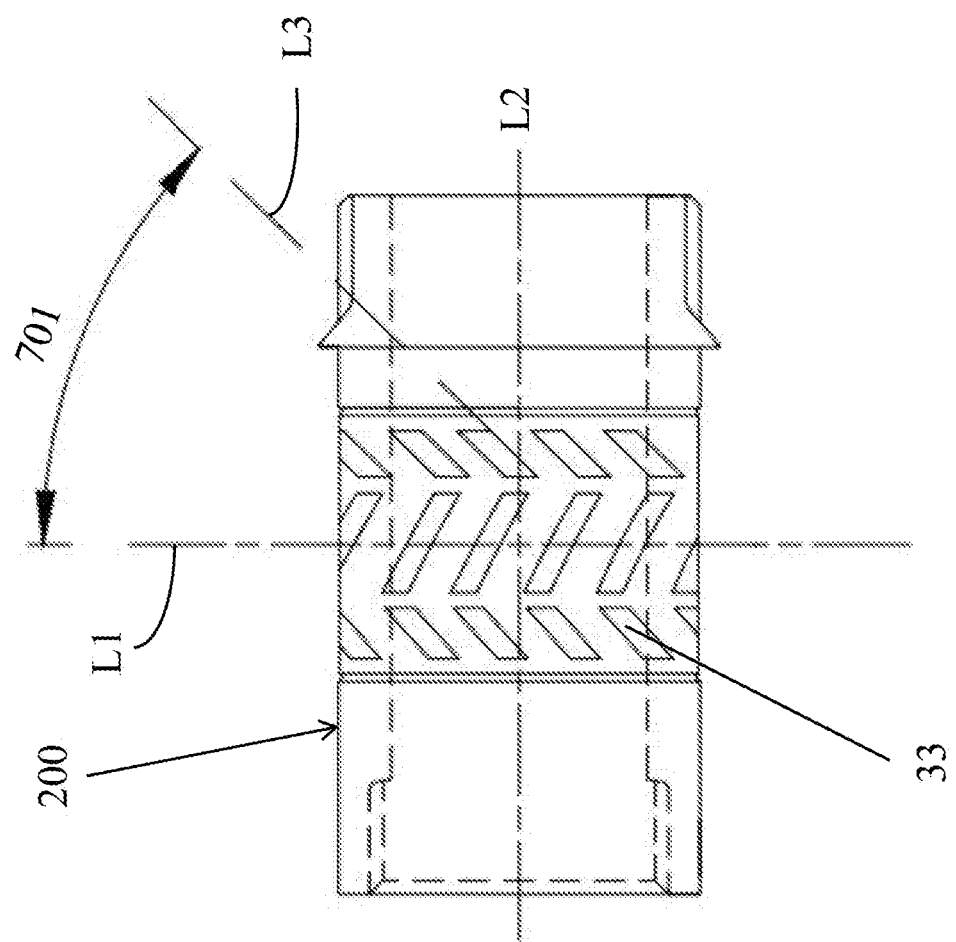
FIG. 7 illustrates another angle formed between a vertical line and strips of another pattern of the magnetic of FIG. 5 according to the present disclosure.

Please refer to FIG. 4 to FIG. 5, and then refer to FIG. 6 and FIG. 7. FIG. 6 illustrates an angle 700 formed between a vertical line L1 and strips 300 of the pattern of the magnetic material 3 of FIG. 5 according to the present disclosure; FIG. 7 illustrates an angle 701 formed between the vertical line L1 and strips 33 of another pattern of the magnetic material 3 of FIG. 5 according to the present disclosure. In the present disclosure, the pattern is formed without being glued and by the magnetic material 3 through a spraying machining process, a sandblasting machining process, a knurl forming machining process, a knurl cutting machining process, a powder metallurgy, an embedding process, etc. Because the pattern of the magnetic material 3 is one-piece integrated into the surface of the sleeve 2, the operation parameter can be detected precisely and instantly. In the present disclosure, the pattern can be V-shaped or Z-shaped to form the corresponded magnetic variation. In FIG. 6, the pattern of the magnetic material 3 on a sleeve surface 200 is V-shaped. The pattern includes a strip 300. The angle 700 is formed between a tangent line L3 of the strip 300 and a vertical line L1 of a central rotating shaft line L2 of the sleeve 2. The angle 700 can be ranged between 20 degrees to 70 degrees or 110 degrees to 160 degrees. In FIG. 7, the pattern of the magnetic material 3 is Z-shaped. The pattern includes a strip 33. The angle 701 is formed between the tangent line L3 of the strip 33 and the vertical line L1 of the central rotating shaft line L2 of the sleeve 2. The angle 701 can be ranged between 20 degrees to 70 degrees or 110 degrees to 160 degrees. Thereby, a voltage around the coil 4 will be varied by the torque generated form pedaling the left crank 11 or the right crank 12 when the pattern of the magnetic material 3 is rotated with the central shaft 1.

Various kinds of patterns of the magnetic material 3 can be formed. Please refer to FIG. 8 to FIG. 12. FIG. 8 illustrates an arrangement of the V-shaped pattern according to the present disclosure; FIG. 9 illustrates an arrangement of the Z-shaped pattern according to the present disclosure; FIG. 10 illustrates another arrangement of the V-shaped pattern according to the present disclosure; FIG. 11 illustrates another arrangement of the Z-shaped pattern according to the present disclosure; FIG. 12 illustrates still another arrangement of the Z-shaped pattern of the present disclosure.

In FIG. 8, the pattern of the magnetic material 3 is V-shaped and includes two regions. Each of the regions includes a plurality of parallel strips, and the strips the two regions are with different parallel directions. In FIG. 8, sides of the strips in each of the regions are connected to form a first type 800. In FIG. 9, the pattern is Z-shaped and includes three regions, each of the regions includes a plurality of parallel strips, and the strips in a central region of the three regions are with different parallel direction to the other two adjacent regions. In FIG. 9, sides of the strips in each of the regions are connected to form a second type 801. In FIG. 10, sides of the strips in each of the regions are unconnected to form a third type 802. In FIG. 11, sides of the strips in each of the regions are unconnected to form a fourth type 803. In FIG. 12, sides of the strips in a central region are connected with sides of the strips in one region adjacent to the central region, and sides of the strips in the central region are unconnected with sides of the other one region adjacent to the central region to form a fifth type 804. Different types of patterns are suitable for different machining types and form different shear deformations.

It also should be mentioned that the pattern of the magnetic material can be one-piece integrated into the surface of the sleeve by means of powder metallurgy.

Figures 13A, 13B:
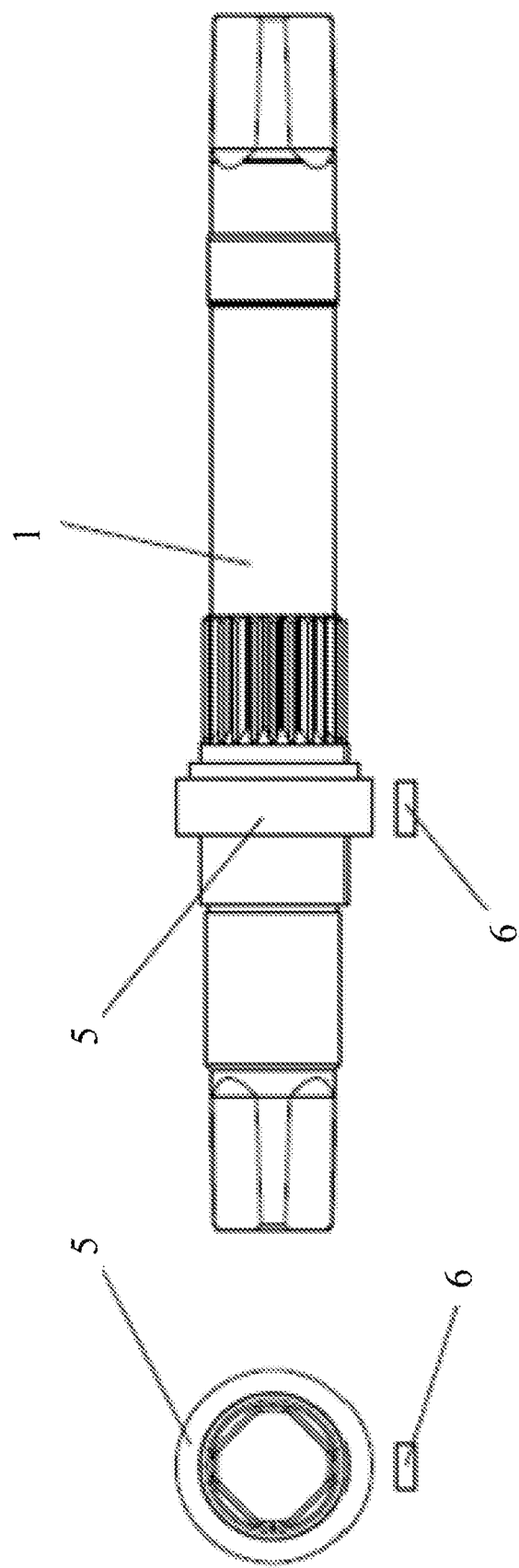
FIG. 13A illustrates a left side view of a relative position of a magnetic ring, a central shaft and a first Hall sensor of the operation parameter detecting apparatus of FIG. 1.
FIG. 13B illustrates a front view of the relative position of the magnetic ring, the central shaft and the first Hall sensor of FIG. 13A.
Figures 14A, 14B:
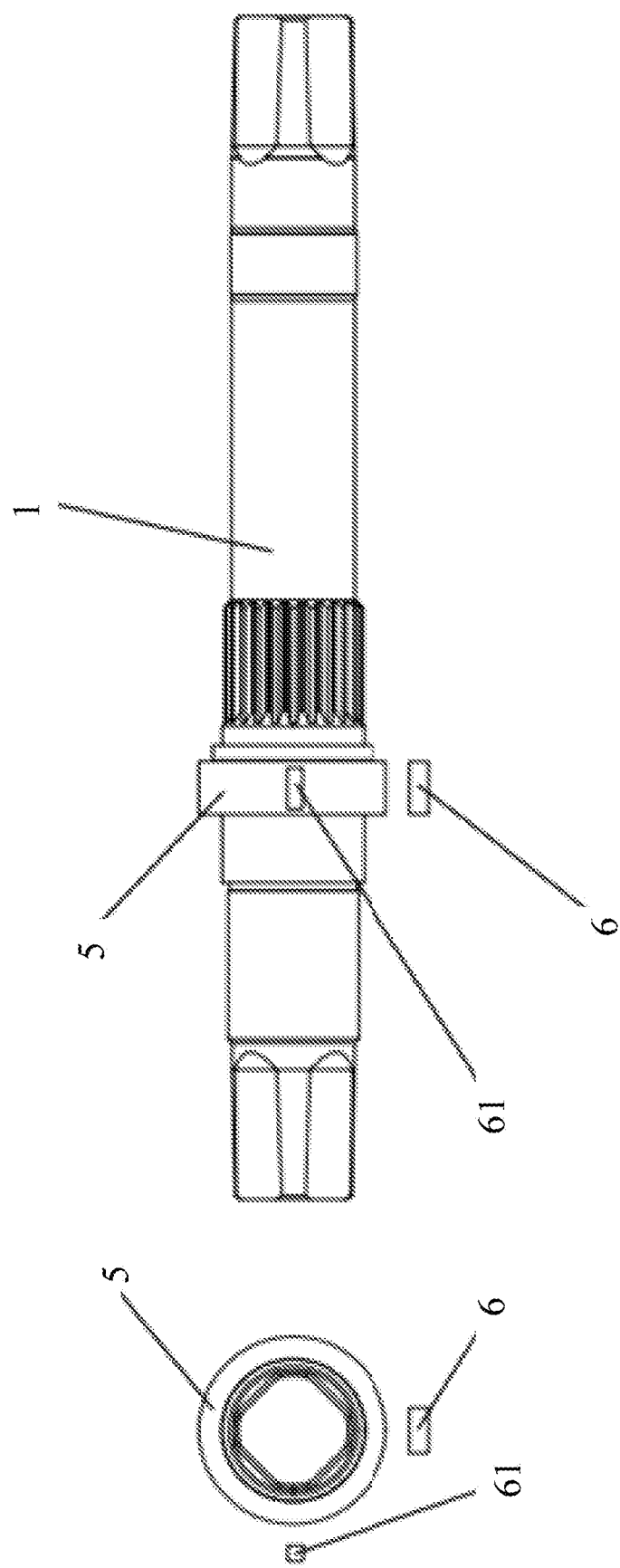
FIG. 14A illustrates a left side view of a relative position of the magnetic ring, the central shaft, the first Hall sensor and a second Hall sensor according to another embodiment of the present disclosure.
FIG. 14B illustrates a front view of the relative position of the magnetic ring, the central shaft, the first Hall sensor and a second Hall sensor of FIG. 14A.

Please refer to FIG. 13A to FIG. 14B. FIG. 13A illustrates a left side view of a relative position of the magnetic ring 5, the central shaft 1 and the first Hall sensor 6 of the operation parameter detecting apparatus of FIG. 1; FIG. 13B illustrates a front view of the relative position of the magnetic ring 5, the central shaft 1 and the first Hall sensor 6 of FIG. 13A; FIG. 14A illustrates a left side view of a relative position of the magnetic ring 5, the central shaft 1, the first Hall sensor 6 and a second Hall sensor 61 according to another embodiment of the present disclosure; FIG. 14B illustrates a front view of the relative position of the magnetic ring 5, the central shaft 1, the first Hall sensor 6 and a second Hall sensor 61 of FIG. 14A.

From FIG. 13A to FIG. 14B, the relative position and the number of the magnetic ring 5, the first Hall sensor 6 and the second Hall sensor 61 can be varied to further measure a two or three dimensional magnetic flux density, thereby a better measurement result can be obtained. The detailed descriptions will be stated as following embodiments.

Please refer to FIG. 15 to FIG. 24. The series of drawings show that the distribution of the magnetic flux density on the surface of the magnetic ring 5 is partly a monotonic increasing function or a monotonic decreasing function, preferably a strictly increasing function or a strictly decreasing function, with a sine waveform, therefore the waveform of the voltage, e.g. an analog voltage, outputted from the corresponding Hall sensor is also partly a monotonic increasing function or a monotonic decreasing function, preferably a strictly increasing function or a strictly decreasing function, with the sine waveform. A situation of the voltage can be obtained from any position on the waveform, and the waveform partly represented as the strictly increasing function or the strictly decreasing function can be used to achieve instant, simple and precise signal measurement. Therefore, in the present disclosure, the variations of the magnetic ring 5, the first Hall sensor 6 and the second Hall sensor 61 can form complicated waveform of the distribution of the magnetic flux density on the surface of the magnetic ring 5 or a variation of the voltage, and a precise measurement result can be obtained by analyzing the analog signals.

Figure 15:
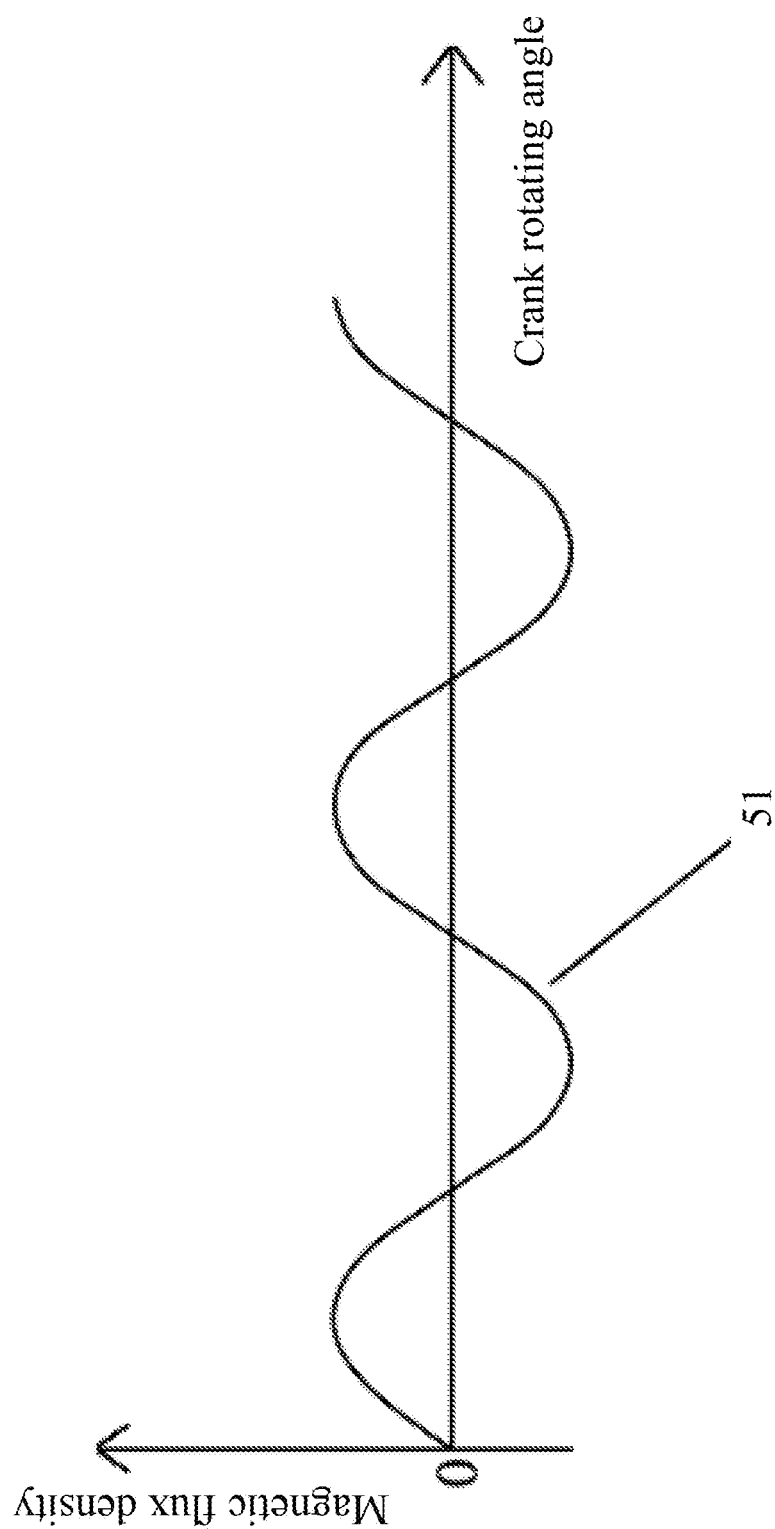
FIG. 15 illustrates a sine waveform of a magnetic flux density on a surface of the magnetic ring corresponded to a rotating angle of a left crank or a right crank according to the present disclosure.
Figure 16:
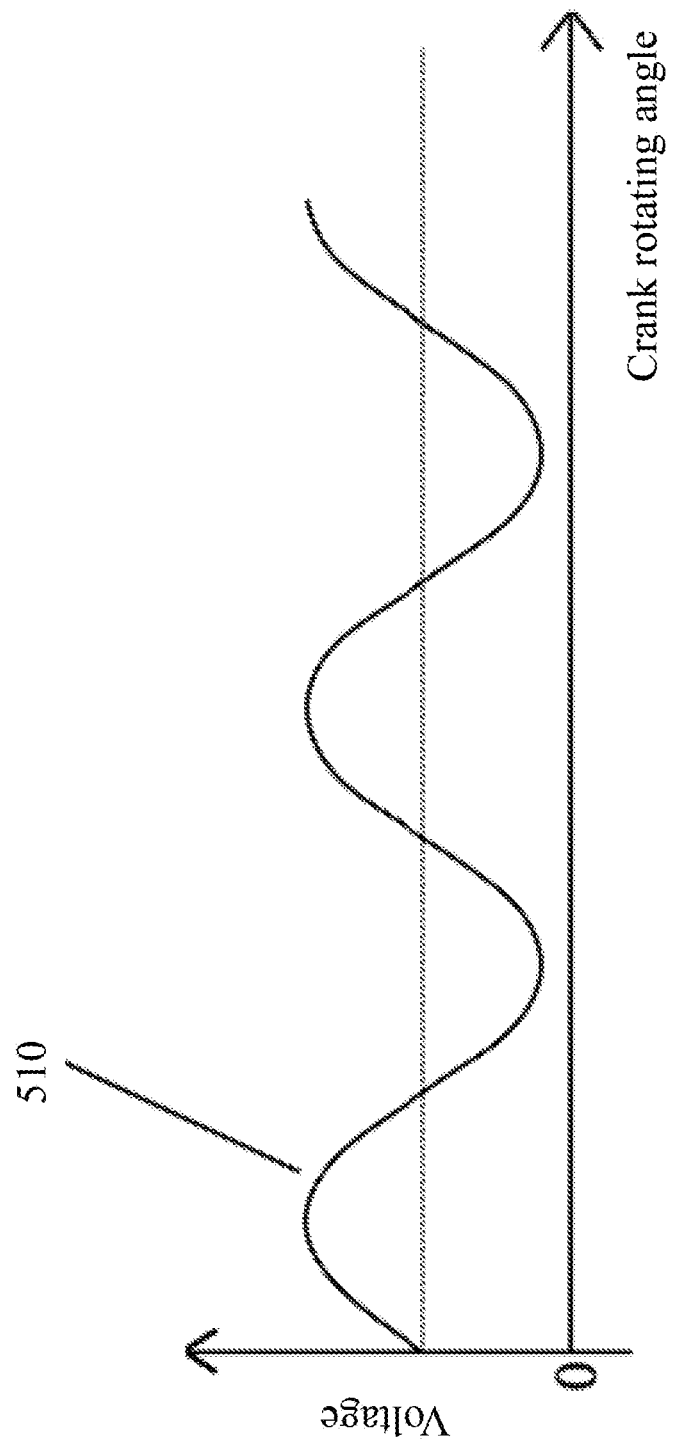
FIG. 16 illustrates a sine waveform of an output voltage from the first Hall sensor corresponded to the rotating angle of the left crank or the right crank according to the present disclosure.

In FIG. 15, when the magnetic ring 5 is rotated with the central shaft 1, the magnetic flux density around the first Hall sensor 6 is also changed. At the time, the first Hall sensor 6 is a linear type, and the magnetic ring 5 corresponding to the rotating angle of the left crank 11 or the right crank 12 can be axial or radial magnetized to generate a magnetic flux density 51 with a sine waveform. In FIG. 16, the first Hall sensor 6 outputs a voltage 510 with a sine waveform. Therefore, by analyzing a small variation of the voltage 510, a rotating angle value of the magnetic ring 5, the central shaft 1, the left crank 11 and the right crank 12 can be obtained, and a rotating speed value can also be obtained. It should be mentioned that the sine waveform is just one type of waveform of the strictly increasing function or the strictly decreasing function. Another type of waveform should also possibly be applied.

In the present disclosure, the magnetic ring 5 may contain two magnetic poles, and the combination of an output voltage value from the first Hall sensor 6 and a slope of the voltage waveform together corresponds uniquely to a position angle value of the magnetic ring 5. Furthermore, the magnetic ring 5 is assembled at an angle relative to the left crank 11 or the right crank 12, such that the first Hall sensor generates correspondingly a unique set of the output voltage and the slope of the voltage waveform.

Figure 17:
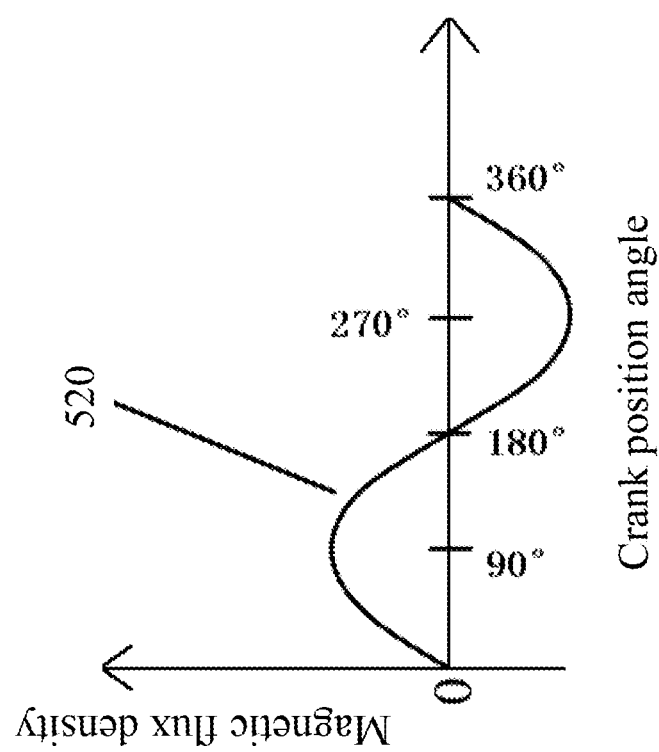
FIG. 17 illustrates a two-pole sine waveform of the magnetic flux density on the surface of the magnetic ring corresponded to a position angle of the left crank or the right crank according to the present disclosure.
Figure 18:
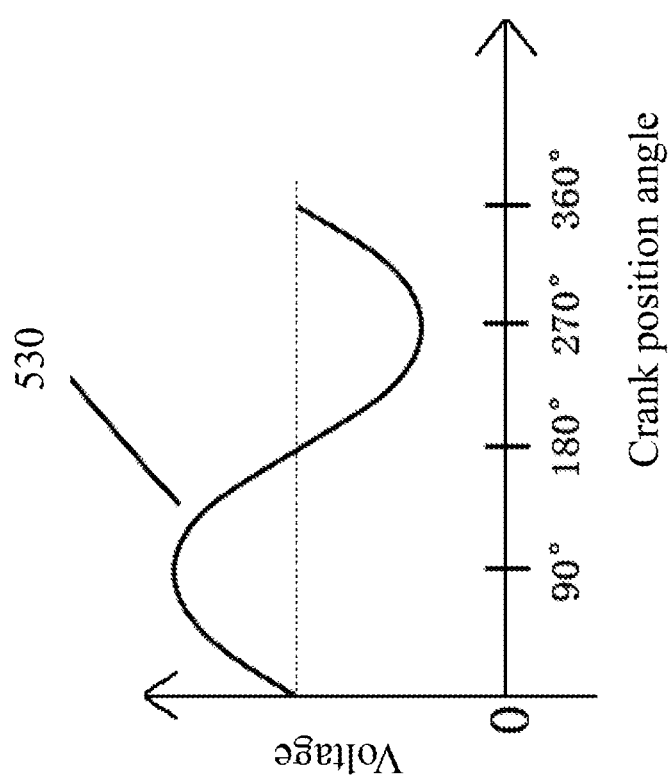
FIG. 18 illustrates a two-pole sine waveform of an output voltage from first Hall sensor corresponded to a position angle of the left crank or the right crank according to the present disclosure.

In FIG. 17, the magnetic ring 5 can be axially or radially magnetized to produce a magnetic flux density 520 with a sine waveform. Thereby, when the central shaft 1 runs within a circle, 360 degrees, the magnetic flux density of the magnetic ring 5 and the position angle of the central shaft 1 can be uniquely corresponded. Furthermore, the left crank 11 and the right crank 12 are oppositely disposed on the central shaft 1, and are corresponded to the magnetic flux density 520 which has a two-pole sine waveform. In FIG. 18, when the left crank 11 and the right crank 12 are rotated, the first Hall sensor 6 which is a linear type can sense and output a voltage 530 with two-pole sine waveform, thus the position angle value and the rotating speed value of the magnetic ring 5, the central shaft 1, the left crank 11 and the right crank 12 can be obtained through analyzing the value and the variation of the voltage of the voltage 530.

Figure 19:
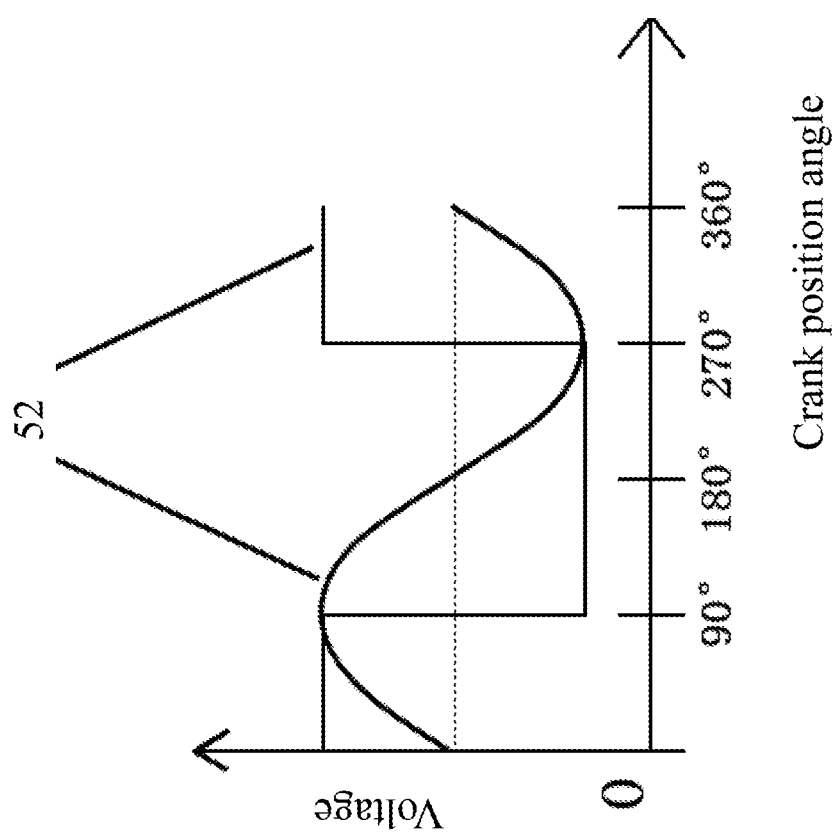
FIG. 19 illustrates a sine waveform and a square waveform of an output voltage from the first Hall sensor and an output voltage from the second Hall sensor respectively, which is corresponded to the left crank and the right crank according to the present disclosure.
Figure 20:
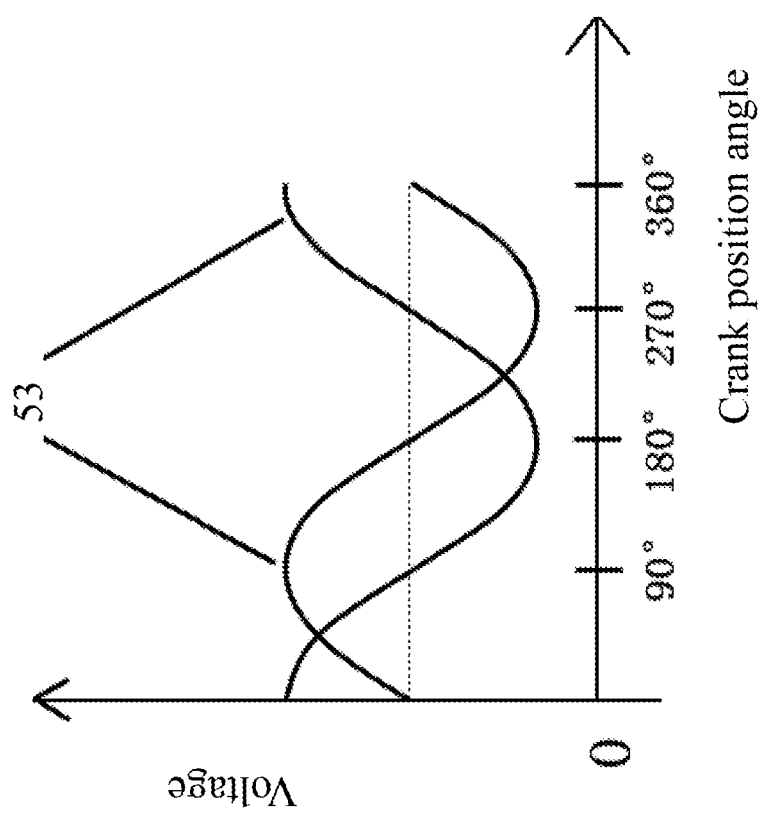
FIG. 20 illustrates two orthogonal sine waveforms of voltages outputted from the first Hall sensor and the second Hall sensor respectively, which are corresponded to a position angle of the left crank and the right crank according to the present disclosure.

In the present disclosure, the number of the Hall sensors can be varied. For example, two Hall sensors, the first Hall sensor 6 and the second Hall sensor 61, can be adopted. The first Hall sensor 6 and the second Hall sensor 61 are separated by the circumferential angle of 90 degrees, or the first Hall sensor 6 and the second Hall sensor 61 are arranged with a phase angle difference of 90 degrees of the output voltage waveform (or using more pairs of Hall sensors), thereby increasing the measurement accuracy or further detecting a one, two or three dimensional magnetic flux density. The magnetic flux density of magnetic ring 5 in the two or three dimensional space can be represented as a curve trace. The curve trace is corresponded to a variation of the magnetic flux density and is partly a monotonic increasing function or a monotonic decreasing function; preferably a strictly increasing function or a strictly decreasing function in an area with the same polarity of the magnetic ring 5. When the left crank 11 and the right crank 12 are rotated, the first Hall sensor 6 and the second Hall sensor 61 can output two orthogonal waveforms, thereby increasing the measurement accuracy. In FIG. 19, the second Hall sensor 61 is a switch type, and the first Hall sensor 6 and the second Hall sensor 61 is corresponded to the position angle of the left crank 11 and the right crank 12 respectively, and a voltage 52 outputted from the first Hall sensor 6 and the second Hall sensor 61 respectively have a square waveform and a triangle waveform which are orthogonal. In FIG. 20, the second Hall sensor 61 is a linear type, and a voltage 53 outputted from the first Hall sensor 6 and the second Hall sensor 61 respectively have two orthogonal sine waveforms.

Figure 21:
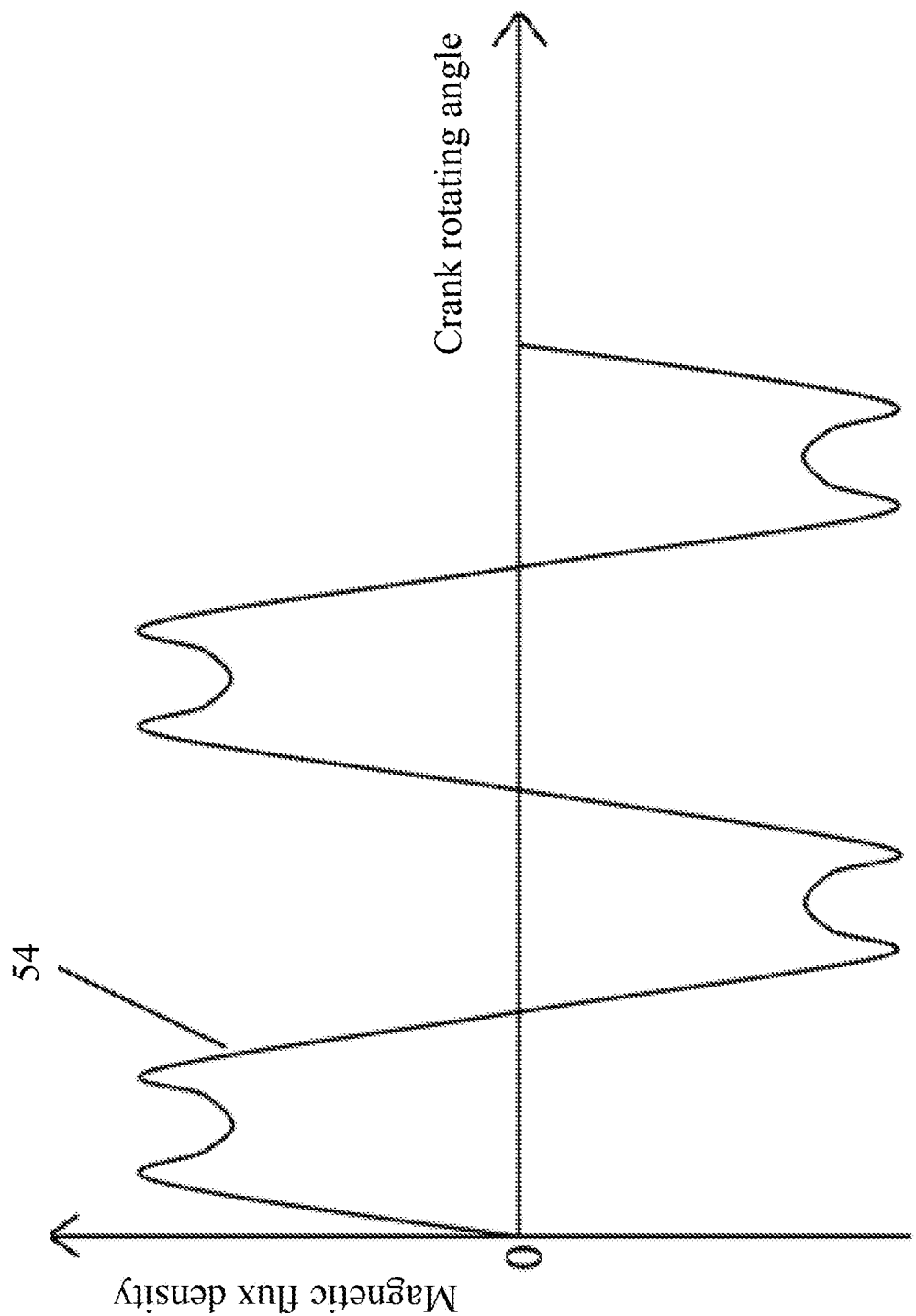
FIG. 21 illustrates a concave waveform of the magnetic flux density on the surface of the magnetic ring corresponded to the rotating angle of the left crank or the right crank according to the present disclosure.
Figure 22:
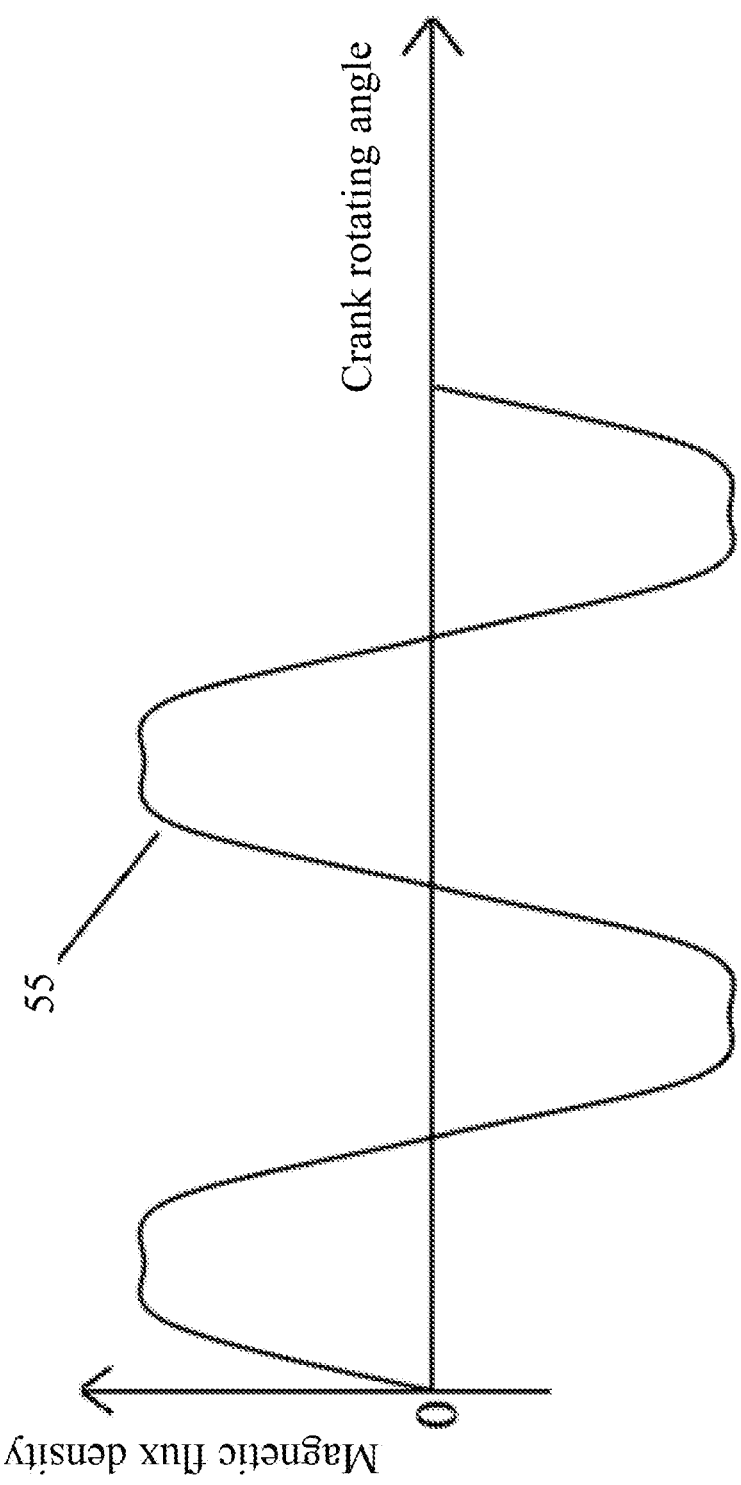
FIG. 22 illustrates a trapezoid waveform of the magnetic flux density on the surface of the magnetic ring corresponded to the rotating angle of the left crank or the right crank according to the present disclosure.
Figure 23:
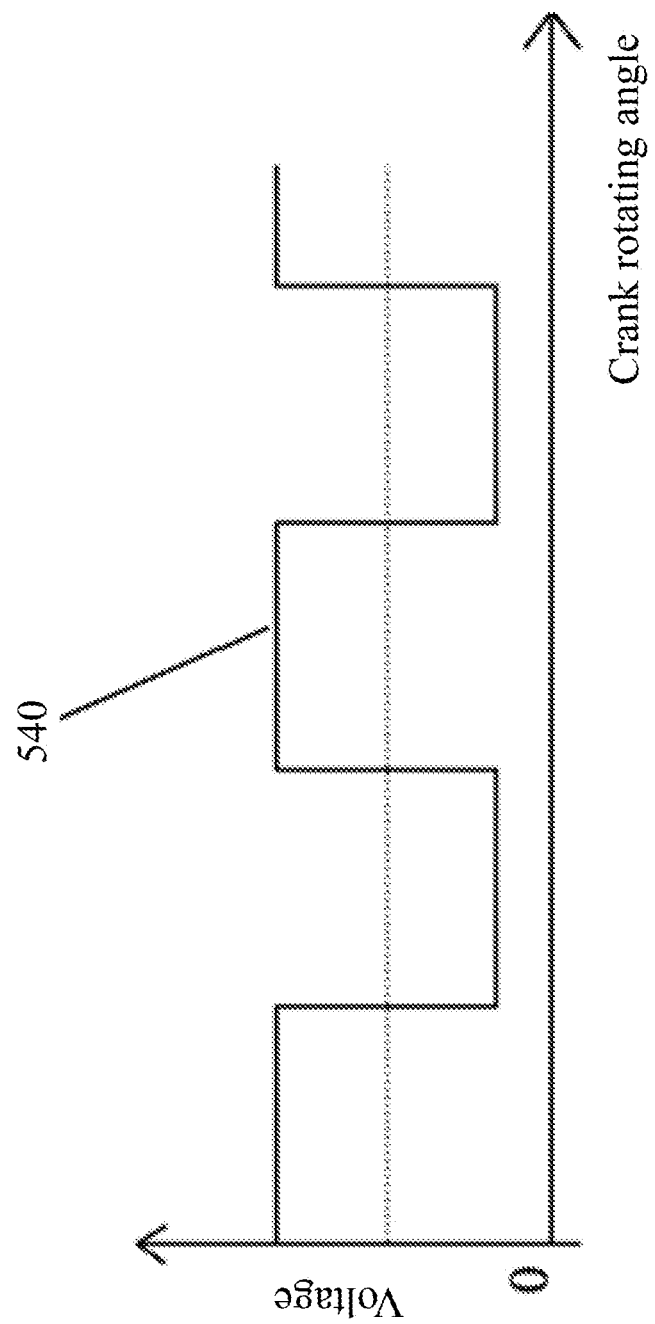
FIG. 23 illustrates a square waveform of the output voltage from the first Hall sensor corresponded to the rotating angle of the left crank or the right crank according to the present disclosure.

In FIG. 21, a concave waveform of a magnetic flux density 54 of the magnetic ring 5 which is corresponded to the rotating angle of the left crank 11 and the right crank 12 is shown. In FIG. 22, a trapezoid waveform of a magnetic flux density 55 of the magnetic ring 5 is shown. In FIG. 23, the first Hall sensor 6 can be a switch type, and a voltage 540 with a square waveform is shown.

Figure 24:
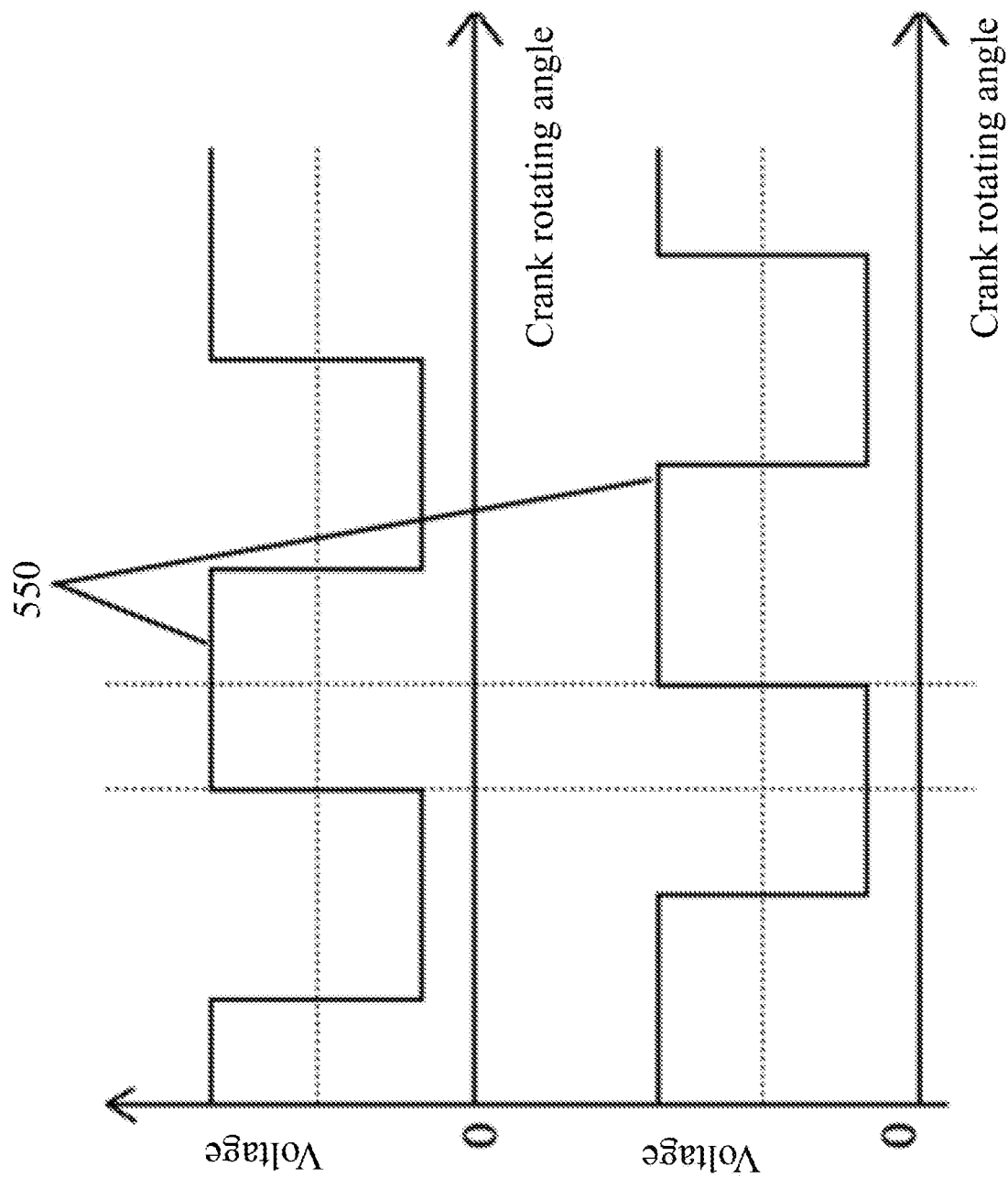
FIG. 24 illustrates two orthogonal square waveforms of the voltages outputted from the first Hall sensor and the second Hall sensor respectively, which are corresponded to the position angle of the left crank and the right crank according to the present disclosure.

In FIG. 24, the first Hall sensor 6 and the second Hall sensor 61 are both switch type. The a voltage 550 outputted from the first Hall sensor 6 and the second Hall sensor 61 respectively are represented two orthogonal square waveforms. Through utilizing the first Hall sensor 6 and the second Hall sensor 61, the dimension of the measured magnetic flux density in the space can be extended form the one dimensional magnetic flux density to the two or three dimensional magnetic flux density, thereby more rotating situations of the magnetic ring 5 can be obtained. If the output voltage from the first Hall sensor 6 and the second Hall sensor 61 are both have sine waveform, the measurement accuracy and reliability can be increased.

From the aforementioned descriptions, it is known that the first Hall sensor 6 and the second Hall sensor 61 together can output plural voltages values, of which the combination presents partly a monotonic increasing function or a monotonic decreasing function, preferably a strictly increasing function or a strictly decreasing function corresponding to an area with the same polarity of the magnetic ring 5, thereby further to detect a one, two or three dimensional magnetic flux density; and the electronic signal processing unit 7 analyzes the values of the voltages and variations of the values for obtaining a position angle value or a rotating angle value of the central shaft.

In sum, the present disclosure has the following advantages:
(a) The measurement accuracy and reliability can be increased by making the pattern of the magnetic material 3 integrated into the surface of the sleeve 2 as one piece without any glue.
(b) By means of the strictly increasing or decreasing distribution function of the magnetic flux density corresponded to the magnetic ring 5 rotated with the central shaft 1 in one or multi-dimensional space, the combination of the function value and the slope of the function may correspond uniquely to the position angle of the central shaft 1, of which the rotating angle may be corresponded accurately by the variation of the function.
(c) With the corresponded strictly increasing or decreasing analog output of the first Hall sensor or the second Hall sensor, the accurate operation parameters of a vehicle can be obtained by analyzing the variation of the voltage values.
(d) The one, two or three dimensional magnetic flux density can be obtained by combining the corresponded output voltages of plural Hall sensors with respectively different position or orientation, of which the combination presents partly a strictly increasing function or a strictly decreasing function.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. Ail operation parameter detecting apparatus for a vehicle, comprising:
   a central shaft disposed in a bottom bracket of the vehicle;
   a left crank and a right crank oppositely disposed at two ends of the central shaft;
   a sleeve disposed on the central shaft;
   a magnetic material surrounding a surface of the sleeve without being glued and with a pattern;
   a coil surrounding the magnetic material to detect a magnetic variation of the magnetic material;
   a magnetic ring fixed on the central shaft;
   a first Hall sensor corresponded to the magnetic ring and to detect a value and a variation of a magnetic flux density on a surface of the magnetic ring; and
   an electronic signal processing unit electrically connected to the coil and the first Hall sensor;
   wherein each of the left crank and the right crank generates a torque relative to the central shaft to form a deformation of the sleeve, so that the coil generates an induced electromotive force for producing a voltage value by changing a magnetic permeability of the magnetic material, and the electronic signal processing unit analyzes the voltage value so as to obtain a torque value;
   wherein the magnetic ring is rotated with the central shaft, so to change a corresponding distribution of the magnetic flux density and a voltage output from the first Hall sensor so that the electronic signal processing unit analyzes thereby a variation of the voltage to obtain a rotating angle value of the central shaft;
   wherein the electronic signal processing unit calculates a variation of the rotating angle value per unit time for obtaining a rotating speed value of the central shaft.

2. The operation parameter detecting apparatus of claim 1, wherein the pattern upon the magnetic material is formed through a spraying machining process, a sandblasting machining process, a knurl forming machining process, a knurl cutting machining process, a powder metallurgy or an embedding process.

3. The operation parameter detecting apparatus of claim 2, wherein the pattern is V-shaped or Z-shaped.

4. The operation parameter detecting apparatus of claim 2, wherein the pattern is V-shaped and comprises two regions, and each of the regions comprises a plurality of parallel strips, and the strips in the two regions are with different parallel directions.

5. The operation parameter detecting apparatus of claim 2, wherein the pattern is Z-shaped and comprises three regions, and each of the regions comprises a plurality of parallel strips, and the strips in a central region of the three regions are with different parallel direction to the other two adjacent regions.

6. The operation parameter detecting apparatus of claim 4 or claim 5, wherein an angle is formed between a tangent line of each of the strips and a vertical line of a central rotating shaft line of the sleeve.

7. The operation parameter detecting apparatus of claim 6, wherein the angle is ranged between 20 degrees to 70 degrees or 110 degrees to 160 degrees.

8. The operation parameter detecting apparatus of claim 1, further comprising a chain ring disposed on the central shaft, wherein one end of the sleeve is connected to the central shaft, the other end of the sleeve is directly connected to the chain ring or connected to the chain ring via an adaptor.

9. The operation parameter detecting apparatus of claim 1, wherein the coil is one set, two sets with different winding directions, two sets with the same winding direction or three sets.

10. The operation parameter detecting apparatus of claim 1, wherein a portion of the distribution of the magnetic flux density on the surface of the magnetic ring is partly a monotonic increasing function or a monotonic decreasing function.

11. The operation parameter detecting apparatus of claim 10, wherein the distribution of the magnetic flux density in an area with the same polarity is partly a strictly increasing function or a strictly decreasing function.

12. The operation parameter detecting apparatus of claim 11, wherein a waveform of the strictly increasing function or the strictly decreasing function is a sine-like waveform or a triangle-like waveform.

13. The operation parameter detecting apparatus of claim 10, wherein the first Hall sensor is a linear type and corresponded to the magnetic ring, and a waveform of the output voltage from the first Hall sensor is partly a monotonic increasing function or a monotonic decreasing function.

14. The operation parameter detecting apparatus of claim 13, wherein the output waveform of the first Hall sensor corresponded to an area with the same polarity of the magnetic ring is partly a strictly increasing function or a strictly decreasing function.

15. The operation parameter detecting apparatus of claim 14, wherein the waveform is a sine-like waveform or a triangle-like waveform.

16. The operation parameter detecting apparatus of claim 11 or claim 14, wherein the magnetic ring comprises two magnetic poles, and the combination of an output voltage value from the first Hall sensor together with a slope of the voltage waveform corresponds to a position angle value of the magnetic ring.

17. The operation parameter detecting apparatus of claim 16, wherein the magnetic ring is assembled with the left crank or the right crank at an angle, and the first Hall sensor outputs the value of the voltage and the slope of the waveform of the voltage corresponding to a position angle of the left crank or the right crank.

18. The operation parameter detecting apparatus of claim 1, wherein the distribution of the magnetic flux density on the surface of the magnetic ring is a concave waveform or a trapezoid-like waveform.

19. The operation parameter detecting apparatus of claim 1, wherein the first Hall sensor is a switch type.

20. The operation parameter detecting apparatus of claim 1, further comprising a second Hall sensor, wherein the first Hall sensor and the second Hall sensor are arranged at a different orientation, or the first Hall sensor and the second Hall sensor are arranged at different circumferential angles, or the first Hall sensor and the second Hall sensor are arranged by a phase angle difference between the output waveforms of voltage.

21. The operation parameter detecting apparatus of claim 20, wherein the first Hall sensor and the second Hall sensor are separated by the circumferential angle of 90 degrees.

22. The operation parameter detecting apparatus of claim 20 wherein the first Hall sensor and the second Hall sensor are arranged with the phase angle difference of 90 degrees of the output voltage waveform.

23. The operation parameter detecting apparatus of claim 20, wherein the second Hall sensor is a linear type or a switch type.

24. The operation parameter detecting apparatus of claim 1, wherein the magnetic ring is glue-attached or injection-molded on a surface of the central shaft.

25. The operation parameter detecting apparatus of claim 1, wherein a plastic base is disposed at the sleeve.

26. The operation parameter detecting apparatus of claim 1, wherein an electromagnetic shielding cover is disposed around the coil.

27. The operation parameter detecting apparatus of claim 1, wherein a left bearing is disposed in one end of the central shaft, a right bearing is disposed in the other end of the central shaft, a left bottom bracket cup is set with the left bearing, a right bottom bracket cup is set with the right bearing, and the central shaft is located in the bottom bracket of the vehicle by the left bearing, the left bottom bracket cup, the right bearing and the right bottom bracket cup.

28. The operation parameter detecting apparatus of claim 24, wherein a casket is disposed for the sleeve.

29. An operation parameter detecting apparatus for a vehicle, comprising:
  a central shaft disposed in a bottom bracket of the vehicle;
  a left crank and a right crank oppositely disposed at two ends of the central shaft;
  a sleeve disposed on the central shaft;
  a magnetic material surrounding a surface of the sleeve without being glued and with a pattern;
  a coil surrounding the magnetic material to detect a magnetic variation of the magnetic material;
  a magnetic ring rotated with the central shaft, wherein a distribution of a magnetic flux density in a two dimensional space or a three dimensional space on a surface of the magnetic ring is represented as at least one curve trace, and a variation of the magnetic flux density corresponded to the curve trace is partly a monotonic increasing function or a monotonic decreasing function;
  at least two Hall sensors corresponded to the magnetic ring to detect the magnetic flux density on the surface of the magnetic ring in the two dimensional space or the three dimensional space, wherein the position or the orientation of the Hall sensors are different; and an electronic signal processing unit electrically connected to the coil and the Hall sensors;

wherein each of the left crank and the right crank generates a torque relative to the central shaft to form a deformation of the sleeve, so that the coil generates an induced electromotive force for producing a voltage value by changing a magnetic permeability of the magnetic material, and the electronic signal processing unit analyzes the voltage value so as to obtain a torque value;

wherein a distribution of a one, two or three dimensional magnetic flux density changes as the magnetic ring rotated with the central shaft, so Hall sensors outputted plural voltage values, of which the combination presents partly a monotonic increasing function or a monotonic decreasing function, and the electronic signal processing unit analyzes the values of the voltages and variations of the values to obtain a position angle value or a rotating angle value of the central shaft;

wherein the electronic signal processing unit calculates a variation of the rotating angle value per unit time for obtaining a rotating speed value of the central shaft.

30. The operation parameter detecting apparatus of claim 29, wherein the pattern upon the magnetic material is formed through a spraying machining process, a sandblasting machining process, a knurl forming machining process, a knurl cutting machining process, a powder metallurgy or an embedding process.

31. The operation parameter detecting apparatus of claim 29, wherein the variation of the magnetic flux density in an area with the same polarity of the magnetic ring is partly a strictly increasing function or a strictly decreasing function.

32. The operation parameter detecting apparatus of claim 29, wherein the combination of the plural voltage values from the Hall sensors corresponded to an area with the same polarity of the magnetic ring presents partly a strictly increasing function or a strictly decreasing function.

* * * * *